May 24, 1938. J. F. WALLACE 2,118,455
SHOCK ABSORBER FOR AIRPLANES
Filed July 2, 1936 2 Sheets-Sheet 1

INVENTOR.
JOHN F. WALLACE
BY
ATTORNEYS.

May 24, 1938.  J. F. WALLACE  2,118,455
SHOCK ABSORBER FOR AIRPLANES
Filed July 2, 1936  2 Sheets-Sheet 2
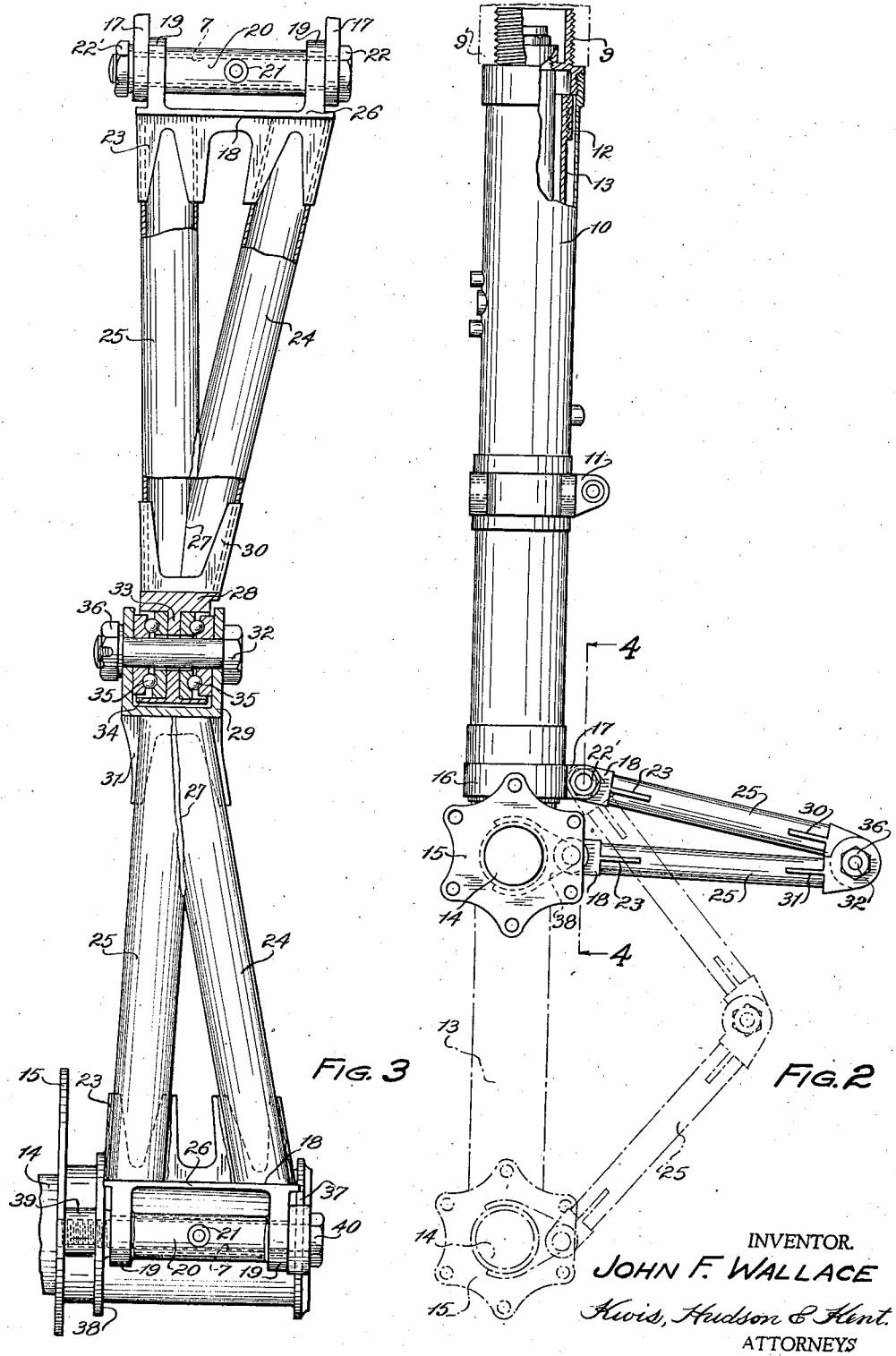
INVENTOR.
JOHN F. WALLACE
ATTORNEYS Patented May 24, 1938

2,118,455

UNITED STATES PATENT OFFICE 2,118,455

SHOCK ABSORBER FOR AIRPLANES

John F. Wallace, Cleveland, Ohio, assignor to The Cleveland Pneumatic Tool Company, Cleveland, Ohio, a corporation of Ohio Application July 2, 1936, Serial No. 88,621

7 Claims. (Cl. 267—64)

This invention relates to improvements in shock absorbers for airplanes, and has reference particularly to means for preventing the relative rotation of the telescoping members of a shock absorber. These members are frequently subjected to heavy torsional strains, as for instance where the shock absorber carries a ground wheel at its lower end, and no provision outside of the shock absorber itself is made for holding the wheel in its desired plane and counteracting the tendency toward deflection of the wheel resulting when it strikes an obstacle.

One of the objects of the invention is the provision of means carried by the shock absorber, but entirely outside of the telescoping cylinders, for preventing relative rotation of the cylinders.

Another object is the provision of means of this character which shall stand closest to the shock absorber and be least effective when the airplane is in the air or at the point of landing and torsional strains are at a minimum, and shall project furthest from the shock absorber and be most effective when the airplane is on the ground and its weight is supported entirely by the shock absorbers.

Other objects and features of novelty will appear as I proceed with the description of that embodiment of the invention which, for the purposes of the present application, I have illustrated in the accompanying drawings, in which—

Fig. 2 is a side elevational view of the shock absorber on a larger scale.

Fig. 3 is a detail view partly in section of a new device which I term a torque knee.

Figure 1:
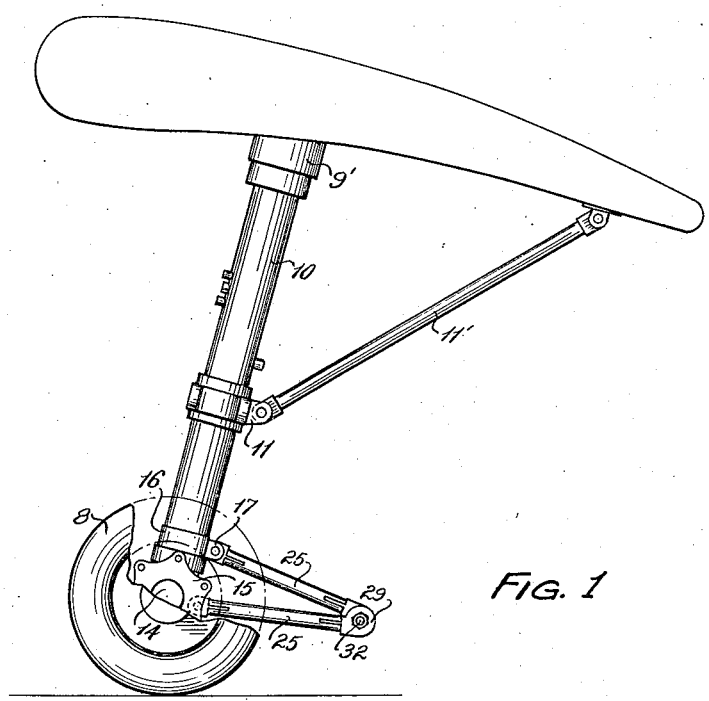
Fig. 1 is a side elevational view of a shock absorber embodying the invention applied to an airplane.
Figure 4:
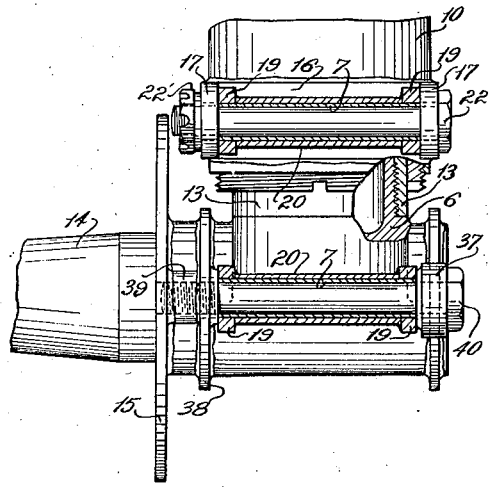
Fig. 4 is a detail sectional view substantially on the line 4—4 of Fig. 2, showing the hinge mountings for the torque knee.

In the drawings, 10 represents the upper cylinder of a hydro-pneumatic shock absorber. Its outer extremity is connected by any suitable means, such as by an externally threaded circular flange 9, with a frame supported bracket 9' of the airplane or a wing thereof, to which it is rigidly attached. A pair of lips 11 are provided for the reception of a suitable brace 11' to assist in maintaining the mounting of the cylinder. Within the cylinder 10 there is a piston 12 carried upon a tubular piston rod or telescoping cylinder 13, which projects of course beyond the open end of the cylinder 10. The projecting end of cylinder 13 is internally threaded to receive a bracket 6 which, after being screwed home, is locked against turning by suitable means. This bracket has a hub portion in which is mounted a wheel spindle 14. It also carries a brake flange 15. When the shock absorber is assembled on an airplane the spindle 14 of course stands transversely of the machine. The wheel spindle of an airplane frequently has a cantilever mounting, as in the present instance, which produces heavy torsional strains whenever the wheel 8 strikes an obstruction, but even with an axle mounting wherein the axle is supported at both ends, the torsional strains on the shock absorber may be considerable due to the twisting effect experienced when the wheel strikes such an obstruction.

The cylinder 10 at its lower extremity has secured thereto a collar 16 from which there projects a pair of ears 17 with aligned perforations therein, the perforations extending transversely of the airplane or parallel to the spindle 14. The upper end of the torque knee is hingedly mounted between these ears.

Referring now to the detail construction of the torque knee, 18 is a forging having a pair of perforated ears 19 which are adapted to fit within the ears 17. A spacing and bearing sleeve 20 is used between the ears 19 to which it is welded, and is useful as a container for lubricant, which may be introduced through a grease connection 21. A bushing 7 is mounted within the sleeve 20 and within the holes in the ears 17 and 19, so that new bearing surfaces may be supplied when wear occurs. Through the ears 17 and the bushing 7 there extends a bolt 22, with a nut 22' on one end thereof.

The forging 18 comprises, in addition to the ears 19, a flat plate 23 having several cut-outs for the purpose of reducing the weight of the part. The two forgings 18 at opposite ends of the torque knee are identical, and the plates 23 in each case are used for attachment to the legs of the torque knee. These legs may be built up of two steel tubes 24 and 25. Each tube at its outer end is slotted diametrically so as to fit over the plate 23 and up against a flat head 26 on the forging. When in proper position the two tubes are welded to the plate 23 and to the head 26.

The two tubes 24 and 25 are inclined toward each other and merge at the knee joint, that is to say they are trimmed off at the proper angles to form meeting edges which are welded together along the line indicated at 27 in the drawings. These ends of the legs, which I term the outer ends inasmuch as they extend away from the shock absorber proper, are mounted in forgings 28 and 29. These forgings comprise flat plates 30 and 31 respectively, that are mounted in slots formed in the merged outer ends of the legs, the tubular elements and the plates 30 and 31 respectively being secured together by welds.

The forging 29 beyond the plate 31 is shaped like a partial cylinder with flat ends, the latter being perforated to take a bolt 32. The forging 28 has a central web 33 with a perforation in the middle thereof and with a head 34 that is a fragment of a cylinder of a size to clear the ends of the forging 29 when the joint is assembled. Two ball bearings 35 are positioned upon opposite sides of the web 33, and these parts are then inserted into the hollow interior of the forging 29, after which bolt 32 is inserted through the aligned perforations in the two elements of the joint and the holes through the bearings after which a nut 36 is drawn up and locked.

The bracket 6 which carries wheel spindle 14 has attached thereto ears 37 and 38 having portions embracing and welded to the hub of the bracket. Between these ears, the ears 19 of the forging 18 are received. The ear 38 is bored to receive a cylindrical nut 39, which projects beyond the ear 38 in both directions and is welded thereto and also to the brake flange 15. A bolt 40 is caused to extend through the ear 37, one of the ears 19, the sleeve 20, and the other ear 19, and is threaded into the nut 39, whereby a hinge connection is made between the lower leg of the torque knee and the piston rod 13.

It will be observed that the legs of the torque knee are much wider at their inner ends than at their outer ends, and that the bolts 22 and 40, which constitute the hinge pins between the cylinders and the torque knee, are relatively long as compared with the bolt or hinge pin 32. The inner hinge joints are accordingly firm and accurate. It is essential that these two joints be hinge joints in the true sense of the word. The middle joint or knee joint is preferably a hinge joint, although a different type of flexible joint such as a universal joint could be employed without affecting the functioning of the device, as it is impossible for the legs to get out of alignment if the hinge connections with the telescoping cylinders are free from play.

When the airplane is in flight the connecting rod or inner cylinder 13 takes the position indicated by dot and dash lines in Fig. 2, with the legs of the torque knee in the positions also illustrated in dot and dash lines. At this time the distance between the knee joint and the axis of the shock absorber is at the minimum. This is the position, of course, when the ground wheels first touch the ground in making a landing. At this time, that is when the plane is supported mostly by its wings, the torsional effect of an obstruction encountered by the ground wheel is also of minimum amount. As the plane settles to the ground and the shock absorbers take an increasingly greater proportion of the load the spindle 14 moves toward its position of Fig. 1 and its full line position of Fig. 2, and the knee joint moves outwardly. As the load upon the shock absorbers increases the torsional effect in the shock absorber of an obstacle encountered by the wheel increases, but at the same time the leverage of the torque legs also increases. Hence the present device is such as to do its work most effectively when the demands upon it are greatest.

Having thus described my invention, I claim:

1. In a shock absorber subjected to torsional strains, a pair of telescoping cylinders adapted to be attached to the elements whose relative movements are to be cushioned, upper and lower torque legs connected together at their outer extremities by a flexible joint, and hinge connections between the inner ends of the legs and the two cylinders respectively, said legs being wide at their inner ends and narrow at their outer ends, and the hinge connections at their inner ends being longer than the width of the joint at the outer ends.

2. In a shock absorber subjected to torsional strains, a pair of telescoping cylinders adapted to be attached to the elements whose relative movements are to be cushioned, upper and lower torque legs of greater width than thickness connected together at their outer extremities by a flexible joint, and hinge connections between the inner ends of the legs and the two cylinders respectively, the long dimension of the transverse section of each leg being parallel to the said hinge connections, and the hinge connections at the inner ends of the legs being longer than the width of the joint at the outer ends of the legs.

3. In a shock absorber subjected to torsional strains, a pair of telescoping cylinders adapted to be attached to the elements whose relative movements are to be cushioned, upper and lower torque legs connected together at their outer extremities by a hinge connection, and hinge connections between the inner ends of the legs and the two cylinders respectively, each leg comprising side portions spaced apart and end portions spaced apart, the inner end portion being wider than the outer end portion and the inner hinge connections being longer than the outer hinge connection.

4. In a shock absorber subjected to torsional strains, a pair of telescoping cylinders adapted to be attached to the elements whose relative movements are to be cushioned, upper and lower torque legs connected together at their outer extremities by a flexible joint, and hinge connections between the inner ends of the legs and the two cylinders respectively, each leg comprising two tubular elements spaced apart transversely at the inner end of the leg and joined at the outer end.

5. In a shock absorber subjected to torsional strains, a pair of telescoping cylinders adapted to be attached to the elements whose relative movements are to be cushioned, upper and lower torque legs connected together at their outer extremities by a flexible joint, and hinge connections between the inner ends of the legs and the two cylinders respectively, each leg comprising two tubular elements spaced apart transversely at the inner end of the leg and joined at the outer end, and each leg comprising inner and outer end elements having flat fins, and the tubular elements having slots receiving said fins.

6. In a shock absorber subjected to torsional strains, a pair of telescoping cylinders adapted to be attached to the elements whose relative movements are to be cushioned, upper and lower substantially triangular torque legs of greater width than thickness, an outer flexible joint between the legs at the summits of the triangles, and hinged connections between the respective cylinders and the inner ends of the legs at the bases of the triangles.

7. In a shock absorber subjected to torsional strains, a pair of telescoping cylinders adapted to be attached to the elements whose relative movements are to be cushioned, upper and lower torque legs having inner portions of a cross sectional area greater than that of the outer end portions thereof, hinge connections between the inner ends of the legs and the two cylinders respectively of a torsional capacity corresponding to the torsional strength of the large inner ends of the legs, and a flexible joint between the outer ends of said legs having a torsional capacity corresponding to the torsional strength of the outer ends of the legs.

JOHN F. WALLACE.